(12) United States Patent
Iwasaki et al.

(10) Patent No.: US 7,531,056 B2
(45) Date of Patent: May 12, 2009

(54) RUN-FLAT TIRE SUPPORT AND MANUFACTURING METHOD FOR THE SAME

(75) Inventors: Shinichi Iwasaki, Kodaira (JP);
Kazuma Nakazawa, Kodaira (JP);
Humitaka Ino, Nishitokyo (JP);
Yoshikatsu Hatakeyama, Kodaira (JP);
Shintaro Hayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 167 days.

(21) Appl. No.: 10/581,051

(22) PCT Filed: Nov. 25, 2004

(86) PCT No.: PCT/JP2004/017485

§ 371 (c)(1),
(2), (4) Date: May 30, 2006

(87) PCT Pub. No.: WO2005/051639

PCT Pub. Date: Jun. 9, 2005

(65) Prior Publication Data

US 2007/0102087 A1      May 10, 2007

(30) Foreign Application Priority Data

Nov. 28, 2003   (JP)   ............................. 2003-399361

(51) Int. Cl.
*B29D 30/00* (2006.01)
*B60C 17/00* (2006.01)
(52) U.S. Cl. .................... 156/110.1; 152/516; 152/520; 152/565
(58) Field of Classification Search ................. 152/516, 152/517, 518, 519, 520, 565; 156/110.1
See application file for complete search history.

(56) References Cited

U.S. PATENT DOCUMENTS

| 6,672,226 B2 | 1/2004 | Bohnacker |
| 6,672,349 B1 * | 1/2004 | Glinz et al. ................. 152/156 |

FOREIGN PATENT DOCUMENTS

| DE | 1963774 | * | 10/1970 |
| EP | 60716 | * | 9/1982 |
| JP | 09-295372 A | | 11/1997 |
| JP | 10-297226 A | | 11/1998 |
| JP | 2984690 B2 | | 10/1999 |
| JP | 2001-260235 A | | 9/2001 |
| JP | 2001-277366 | * | 10/2001 |
| JP | 2001-277366 A | | 10/2001 |
| JP | 2002-80979 | * | 3/2002 |
| JP | 2004-058834 A | | 2/2004 |
| JP | 2004-314913 A | | 11/2004 |

* cited by examiner

*Primary Examiner*—Justin Fischer
(74) *Attorney, Agent, or Firm*—Sughrue Mion, PLLC (57) ABSTRACT

A manufacturing method for annular run-flat tire support which has a supporting part and a leg part, and which, at the time of run-flat running, is capable of carrying load, comprises the steps of supplying said supporting part and said leg part, applying a bonding agent including a chemical conversion treatment to the bonding region of the radial-direction inside end part of said supporting part that is provided for bonding to said leg part, and bonding between said radial-direction inside end part and said leg part. Thereby, a manufacturing method for run-flat tire support which maintains a high bondability between the supporting part and the leg part, and is excellent in durability, and a run-flat tire support are provided.

5 Claims, 6 Drawing Sheets

(RIM)

US 7,531,056 B2

RUN-FLAT TIRE SUPPORT AND MANUFACTURING METHOD FOR THE SAME

TECHNICAL FIELD

The present invention relates to an annular run-flat tire support which is disposed in the inside of a tire such that, when it gets punctured, it can run a significant distance as punctured, and a manufacturing method for the same.

BACKGROUND ART

As the pneumatic tire which can run on flat, in other words, the tire which, even when it is punctured, resulting in the tire internal pressure being dropped down to 0 kg/cm$^2$, can run a certain distance safely (which is hereafter to be called the run-flat tire), the inner ring type tire in which an annular inner ring (support) made of metal or synthetic resin is mounted to the rim portion of the tire in the air chamber is known (referring to the patent literatures 1 and 2, for example).

As this inner ring type tire, the rotary inner ring type tire in which the inner ring is incorporated in the rim, and the dual-convex inner ring type tire in which the inner ring is mounted to the rim, having two convex parts in the tire radial direction section (referring to the patent literatures 3 to 6, for example) are known. The rotary inner ring type tire requires a special wheel to fix the rotary inner ring thereto, thus presenting a problem about versatility. On the other hand, the dual convex inner ring type tire is mounted to the conventional rim, thus offering a high versatility.

The ordinary vibration-proof rubber is used in the temperature range equivalent to that of the open air temperature, while the inside of the tire is at high pressure due to the pressurized air, and in addition, at the time of running, it has an increased temperature, thus the environment is presupposed to be significantly hard and easy to cause degradation. However, the conventional art has not sufficiently considered the degradation of the supporting part main body and the corrosion when the main body is made of metal.

The annular support is required to function only at the time of run-flat running, thus it is preferably made up of light-weight materials. When the car is run with such support being assembled in the tire, within which not only the moisture, but also the rubber-compound derived acidic ions, and the like, exist, and the temperature is raised, the possible degradation of the support resulting from it being kept inside the tire for a long term cannot be neglected, even if the tire is not punctured.

In addition, with the run-flat tire support, an annular leg part is bonded to both end parts of the supporting part thereof, and through the leg parts, the support is mounted to the rim. At this time, in order to improve the bondability between the respective end parts of the supporting part and the leg part, the bonding portion of the supporting part has been subjected to a surface roughening treatment by shot blasting in some cases.

However, with the above-mentioned surface roughening treatment, it has been impossible to maintain a high adhesive strength for many hours.

In addition, regardless of whether the above-mentioned surface roughening treatment has been given or not given, the non-uniformity in bonding, or the like, of the bonding portion of the supporting part has caused corrosion, and the like, or caused poor bonding, which, in some cases, has had an ill effect on the run-flat characteristics, including the running stability and the durability.

Further, in the portion of the supporting part to which the leg part is not bonded, the metal is exposed, thus there has been a problem about corrosion resistance, such as that rust may be produced, and the like.

At the time of run-flat running when the internal pressure for the tire has been lowered for some cause, the support as a complex of the supporting part made of metal and the rubber leg part bears the load, however, by this load, the complex is subjected to repetitive distortion while being rotated, and this distortion results in heat generation. The capability of run-flat running assures that the car can run a certain distance with no problems (for example, that it can run 50 km at a speed of 80 km/hr, and the like), however, the heating temperature of the supporting complex when the car has run this distance may exceed 150° C., depending upon the open air temperature. In such a case, with the support which has been formed by applying the conventional two-liquid coating type vulcanization bonding agent for parts jointing, peeling is caused at the boundary between the final coating bonding agent for the supporting part and the rubber composition of the rubber leg part, which has presented that the car cannot run on flat for a sufficient distance.

In addition, at the time of run-flat running, emergency running with the internal pressure being lowered is provided, however, in this case, the convex part of the supporting part is brought into contact with the tire tread part rear surface, carrying the load. However, at the time of emergency running with the vehicle weight being large and the load to be carried being high, the load imposed on the tire tread part is large, which finally may cause a failure in the tire tread part, leading to impossibility of running.

In the patent literature 4, an inner ring which has an added lubrication system for suppressing possible damage to the tread part rear surface is disclosed, however, about suppression of tread damage by adequately setting the sectional geometry of the supporting part, the above-mentioned conventional arts disclose no specific matters.

Patent literature 1: Japanese Patent Laid-Open Publication (JP-A) No. 2002-377519
Patent literature 2: Japanese Patent Laid-Open Publication (JP-A) No. 2001-519279
Patent literature 3: Japanese Patent Laid-Open Publication (JP-A) No. 10-297226/1998
Patent literature 4: Japanese Patent Laid-Open Publication (JP-A) No. 2001-163020
Patent literature 5: Japanese Patent Laid-Open Publication (JP-A) No. 2003-48410
Patent literature 6: U.S. Pat. No. 6,463,974 B1

DISCLOSURE OF THE INVENTION

Problems to Be Solved by the Invention

In view of the above situation, the present invention provides a manufacturing method for run-flat tire support which maintains a high bondability between the supporting part and the leg part, and is excellent in durability, and a run-flat tire support.

Means to Solve the Problems

A first aspect of the present invention provides a manufacturing method for annular run-flat tire support which has a supporting part and a leg part, and which, at the time of run-flat running, is capable of carrying load, comprising: supplying said supporting part and said leg part; applying a surface treatment including a chemical conversion treatment to the bonding region of the radial-direction inside end part of said supporting part that is provided for bonding to said leg part; and bonding said radial-direction inside end part to said leg part.

The surface of said supporting part may be of a metal material.

The region other than said bonding region of said supporting part may be subjected to a rust prevention treatment, or said surface treatment and a rust prevention treatment.

Said rust prevention treatment may be a rust prevention coating treatment which applies a rust preventive coating material, or a plating treatment.

Bonding said radial-direction inside end part of said supporting part to said leg part may be vulcanization bonding.

Said rust prevention treatment may be provided in the state in which said leg part is covered with a masking member to expose said supporting part.

A second aspect of the present invention provides a manufacturing method for annular run-flat tire support which has a supporting part and a leg part, and which, at the time of run-flat running, is capable of carrying load, comprising: supplying said supporting part and said leg part; and the bonding step of applying a bonding agent to the bonding region of the radial-direction inside end part of said supporting part that is provided for bonding to said leg part, and subjecting said leg part in the unvulcanized state to a vulcanization bonding treatment through the bonding agent, whereby the leg part is bonded to said bonding region, wherein the application of said bonding agent at said bonding is a treatment in which a prime coating bonding agent is applied to said bonding region, and then a final coating bonding agent is applied, and said final coating bonding agent is a bonding agent containing a maleimide derivative.

The coating film thickness for said final coating bonding agent may be 2 μm or over.

The step of subjecting said supporting part to a chemical conversion treatment with a zinc phosphate-base treatment agent prior to said bonding step may further be provided.

Said prime coating bonding agent may be a bonding agent containing no halogen.

A third aspect of the present invention provides an annular run-flat tire support which has a supporting part and a leg part; which, at the time of run-flat running, is capable of carrying load, and which is manufactured by a method comprising: supplying said supporting part and said leg part; and applying a bonding agent to the bonding region of the radial-direction inside end part of said supporting part that is provided for bonding to said leg part, and subjecting said leg part in the unvulcanized state to a vulcanization bonding treatment through the bonding agent, whereby the leg part is bonded to said bonding region, wherein the application said bonding agent at said bonding step is a treatment in which a prime coating bonding agent is applied to said bonding region, and then a final coating bonding agent is applied, and said final coating bonding agent is a bonding agent containing a maleimide derivative.

A fourth aspect of the present invention provides an annular run-flat tire support which, at the time of run-flat running, is capable of carrying load, comprising: a supporting part; and a leg part, wherein said supporting part has a coating layer, and a part or all of the surface of said supporting part is formed, being covered with said coating layer, and said coating layer is any one of a resin layer containing a resin, a coating film layer made up of a coating material containing a resin, a vulcanization bonding agent layer containing a rubber ingredient, and a rubber composition layer containing a diene-base rubber as the principal ingredient.

The region of said supporting part that is formed, being covered with said coating layer, may be previously subjected to a chemical conversion treatment with an inorganic salt-base chemical conversion treatment agent.

A fifth aspect of the present invention provides an annular run-flat tire support which, at the time of run-flat running, is capable of carrying load, comprising: a supporting part; and a leg part, wherein said supporting part is made up of a 780 N-class High-Tension steel.

Said supporting part may be worked by drawing; the amount of carbon in said 780 N-class High-Tension steel may be $15 \times 10^{-2}$% or under; and the elongation may be 20% or over.

The carbon equivalent weight of said 780 N-class High-Tension steel may be 0.6 or under.

The cleanliness of said supporting part may be 0.05 or under.

The fifth aspect of the present invention may be adapted such that said supporting part has one or more convex parts which jut out toward the outside in the radial direction section, and one or more concave parts which jut out toward the inside;

at least one of said convex parts is composed of a plurality of circular arcs which are different in radius of curvature, and among these circular arcs, the radius of curvature of the circular arc including the vertex of said convex part is the largest, and the spacing (W) between said convex part and the other convex part which is the closest to the convex part; the height (H) of said convex part; the number (N) of said one or more convex parts; and the radius of curvature (R) of the circular arc including the vertex of said convex part meet the relationship, $R \text{ (mm)} \geq 12 \text{ W/HN}$.

Effect of the Invention

As can be seen from the above description, according to the manufacturing method for run-flat tire support of the present invention, a run-flat tire support which provides a high bondability between the supporting part and the leg part and an excellent durability can be manufactured.

Thus, the run-flat tire support of the present invention provides a high bondability between the supporting part and the leg part and an excellent durability, featuring that the possible degradation of the supporting part, and the possible damage to the portion where the supporting part and the tire inside surface can contact with each other are minimized, and the like.

BEST MODE FOR CARRYING OUT THE INVENTION

[Manufacturing Method for Run-Flat Tire Support]

(First Manufacturing Method)

Hereinbelow, a first manufacturing method for the run-flat tire support of the present invention will be described.

Figure 1:
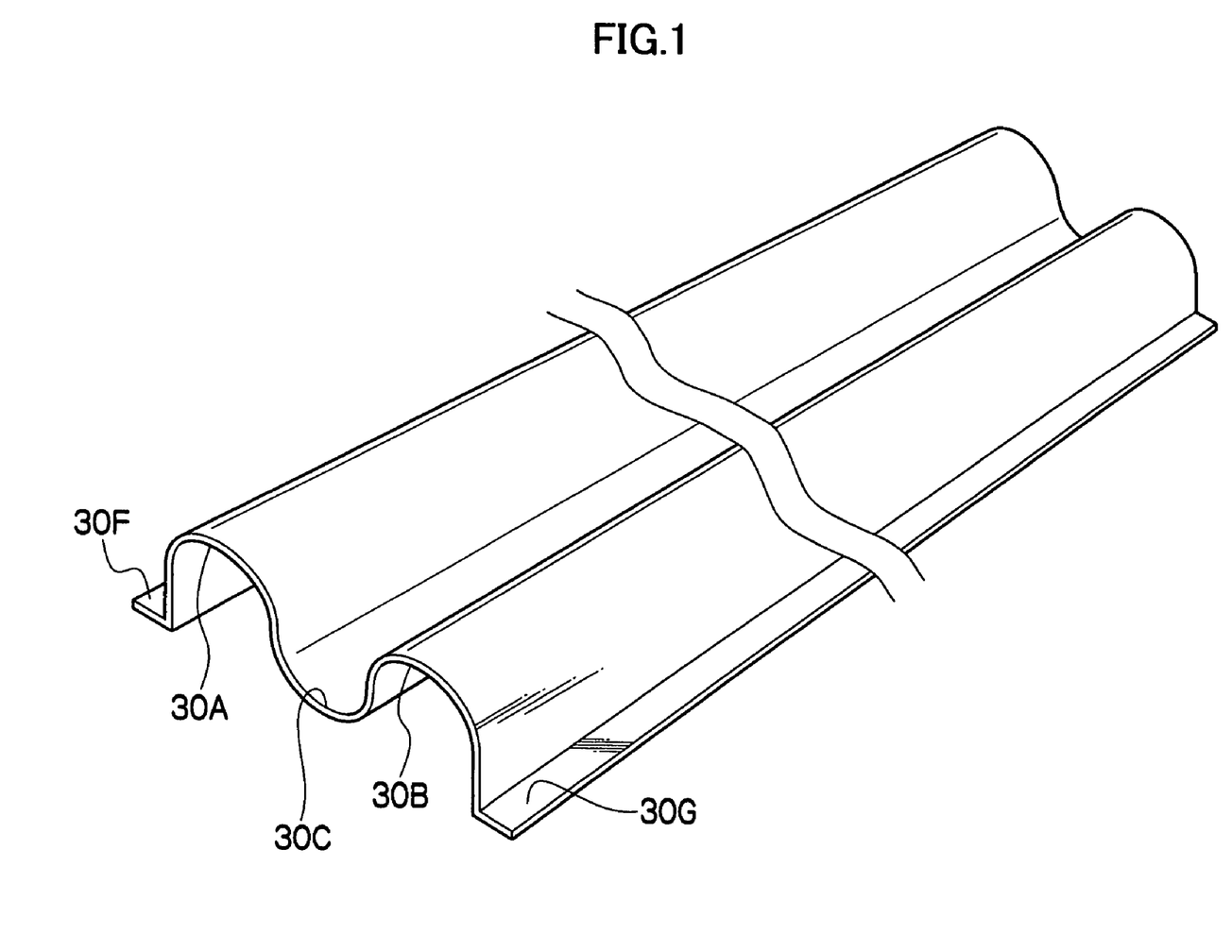
FIG. 1 is a partial perspective side view of the supporting part of the support.

First, the supporting part of the run-flat tire support is manufactured. By using a forming method, such as roll forming, or the like, a flat plate made of metal is formed into a geometry as shown in FIG. 1, for example. In other words, the geometry obtained has a curved part 30A, 30B which juts out upward on the drawing, a curved part 30C jutting out downward, and a flange part 30F, 30G at both edges. Thereafter, as shown in FIG. 2, by bending, or the like, a supporting part 26 of a support 16 is formed in the shape of a ring.

Herein, as the material to be used for the flat plate made of metal, it is preferable to use a material at least the surface of which is made up of a metal material. Examples of such a material include iron, high tension steel, SUS, aluminum, and the like.

The region (the bonding region) of the radial-direction inside end part of the supporting part (which hereinafter may be simply called the "end part") where a leg part is to be bonded to the end part is subjected to a surface treatment including a chemical conversion treatment.

Figure 2:
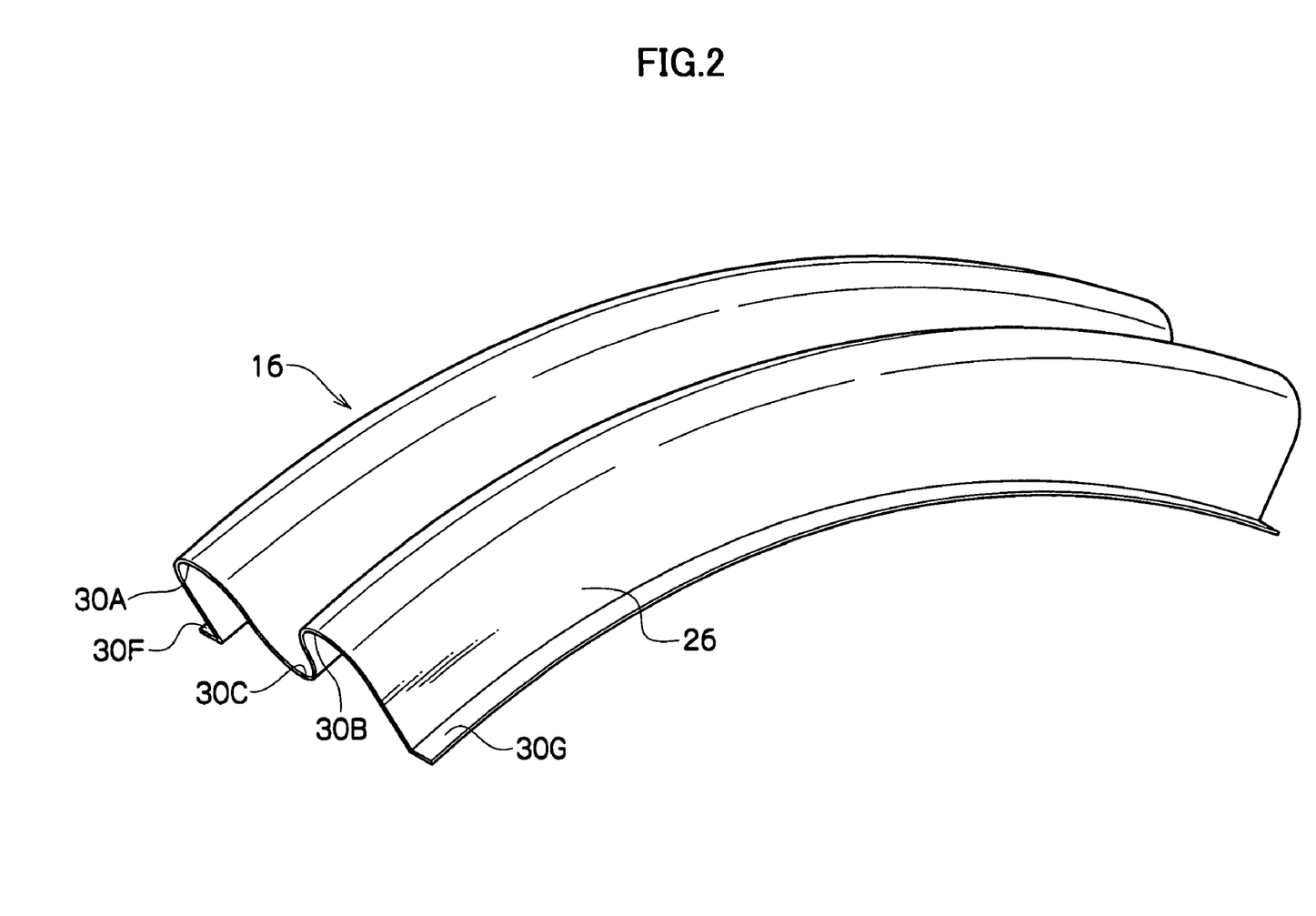
FIG. 2 is a perspective side view of the radial direction half section of the supporting part of the support.

For the supporting part 26 of the support 16 that is shown in FIG. 2, at least the entire flange part 30F, 30G is subjected to a surface treatment including a chemical conversion treatment.

The chemical conversion treatment refers to a treatment for providing a corrosion resistance for the metal surface, and improving the bondability between the leg part later described and the supporting part 26 by forming a thin film with an inorganic salt on the metal surface of the supporting part 26. Therefore, by providing such a chemical conversion treatment, the bondability between the bonding region of the supporting part 26 and the leg part is improved, and thus a high adhesion can be maintained even in run-flat running for many hours.

The expression of such an adhesion results from a phosphate, and the like, used for the chemical conversion treatment being crystallized on the metal surface which provides the bonding region, forming a thin film. In other words, it is estimated that the film formed has a surface irregularity, and the existence of such irregularity provides an anchoring effect for assuring a high adhesive strength. In addition, the existence of such a film can further improve the rust prevention effect (the anti-corrosion effect) in providing a rust prevention treatment for the supporting part 26 later.

As the chemical conversion agent for use in the chemical conversion treatment, phosphates, such as zinc phosphate, zinc-iron phosphate, zinc-calcium phosphate, iron phosphate, manganese phosphate, and the like, can be used. Actually, the above-mentioned chemical conversion agent is appropriately dissolved into a solvent, or otherwise processed, for use.

The thickness of a coating film formed by the chemical conversion treatment is preferably approx. 0.1 to 50 µm, and is more preferably approx. 0.5 to 5 µm.

As a surface treatment other than the chemical conversion treatment, a surface treatment (coating treatment) which applies chromic acid chromate, organic acid titanate, or the like, can be mentioned. Also in this case, the above-mentioned treatment agent is appropriately dissolved into a solvent, or the like, for use.

The thickness of a coating film formed by the coating treatment is preferably approx. 0.1 to 50 µm, and is more preferably approx. 0.5 to 5 µm.

The rust prevention treatment is preferably be provided at least in a portion where the chemical conversion treatment has been afforded. By providing a rust prevention treatment for a portion where the chemical conversion treatment has been afforded, occurrence of rust, and the like, can be prevented to further improve the corrosion resistance.

In addition, the rust prevention treatment may be provided for the supporting part excluding the bonding region. In such a portion, the metal is in the exposed state, being in the environment in which it is susceptible to corrosion, thus by providing the rust prevention treatment, corrosion resistance can be afforded.

As a rust prevention treatment, the rust prevention coating treatment for applying a rust preventive coating material, or otherwise, the plating treatment can be exemplarily mentioned.

The thickness of a coating film formed in performing the rust prevention coating is preferably approx. 0.1 to 500 µm. If the thickness is under 0.1 µm, a sufficient rust prevention effect may not be obtained, and if 500 µm is exceeded, there may occur cracking, or the like, in the surface.

As the material for use in the rust prevention coating, a rust preventive coating material which is used for general metals can be applied. Specific examples thereof include acrylic resin coating materials, polyester-base resin coating materials, polyurethane-base resin coating materials, epoxy-base resin coating materials, fluorocarbon resin-base coating materials, silicon-base coating materials, and the like.

In addition, as the aforementioned plating treatment, zinc plating, chromium plating, electrodeposition coating, and the like, can be mentioned. The preferable plating thickness is the same as for the rust prevention coating.

The chemical conversion treatment and the rust prevention treatment can be carried out by the method which immerses the item in the liquid for the treatment; the method which uses a spray for blowing the surface treatment agent or the rust preventive agent (rust preventive coating material); and the like.

Especially when providing the rust prevention treatment, it is preferable that the leg part be covered with a masking member, and the supporting part be exposed for carrying out the rust prevention treatment. At this time, it is preferable to spray-apply the material while the supporting part is being rotated. By using a masking member, the rust prevention treatment can be selectively provided for a desired range.

After the surface treatment and the rust prevention treatment, which is carried out as required, having been provided, a bonding agent is applied to the bonding portion of the supporting part for vulcanization bonding it to the leg part (the bonding treatment). Thereby, a support at both ends of which a leg part is formed is manufactured.

After the surface treatment having been provided, the leg part may be vulcanization bonded, which may be then followed by providing the rust prevention treatment for the supporting part.

As the bonding agent for use in the vulcanization bonding, it is preferable to use a vulcanization type bonding agent for rubber that is synthetic resin-base, phenolic resin-base, silicone-base, or the like.

As the conditions for vulcanization bonding, the temperature is preferably approx. 120 to 200° C., and the time is preferably approx. 5 to 60 min.

In addition, as the material to be used for the leg part, materials which are NR (natural rubber)-base, IR (isoprene rubber)-base, BR (butadiene rubber)-base, SBR (styrene-butadiene rubber)-base, IIR (butyl rubber)-base, and the like, can be mentioned.

It is preferable that, before applying the final coating bonding agent, the primer treatment be provided. As the primer, it is preferable to use a primer which is synthetic rubber-base, epoxy-base, or phenol-base, being compounded with at least one of polyisocianate, epoxy resin, phenolic resin, synthetic rubber, and the like.

Such a treatment is carried out when a so-called two-liquid-system bonding agent is used. In other words, in the bonding portion, the primer layer by the primer treatment and the cover coat layer thereon are formed.

(Second Manufacturing Method)

A second manufacturing method for the run-flat tire support of the present invention comprises: supplying a supporting part and a leg part; and applying a bonding agent to the bonding region of the radial-direction inside end part of said supporting part that is provided for bonding to said leg part, and subjecting said leg part in the unvulcanized state to a vulcanization bonding treatment through the bonding agent, whereby the leg part is bonded to said bonding region.

With the conventional support in which the leg part is jointed by applying a two-liquid coating type vulcanization bonding agent, peeling is caused at the boundary between the final coating bonding agent provided for the bonding region between the supporting part and the leg part, and the rubber composition in the run-flat running. Then, with the present invention, the application said bonding agent at the bonding step is adapted to be the treatment wherein the prime coating bonding agent is applied to the bonding region, which is then followed by applying the final coating bonding agent, and as the final coating bonding agent, a bonding agent containing a maleimide derivative is used.

As a result of the vigorous examination by the present inventor et al., it has been found that, depending upon the type of final coating bonding agent, there occurs a great difference in durability. And, it has also been found that, among the final coating bonding agents, using a bonding agent containing a maleimide derivative renders the bonding portion relatively stable even at a high heating temperature, thus the mileage before peeling is caused being increased.

The coating film thickness of the final coating bonding agent is preferably approx. 2 μm or over. By providing a thickness of approx. 2 μm or over, a stable adhesive strength can be more positively provided. It is more preferable that the coating film thickness be approx. 5 μm or over.

In addition, it is preferable that at least the supporting part have been subjected to the chemical conversion treatment by a zinc phosphate-base treatment agent. The surface treatment method for the supporting part side can have an effect on the run-flat durability, and compared to the supporting part which has been subjected to no surface treatment, that which has been subjected to the chemical conversion treatment by a zinc phosphate-base treatment agent provides a high durability. In addition, in order to further improve the durability, the blasting treatment is preferably used in conjunction.

The prime coating bonding agent is preferably a bonding agent containing no halogen.

By using a bonding agent containing no halogen as the prime coating bonding agent, a good adhesive strength can be maintained over a long term. In addition, also when the prime coating bonding agent is combined with a final coating bonding agent containing a maleimide derivative, using the prime coating bonding agent containing no halogen can further improve the bonding durability.

In addition, the coating film thickness is preferably approx. 1 to 5 μm, and is more preferably approx. 2 to 5 μm.

The vulcanization bonding treatment presents no problem of peeling at the boundary between the rubber and the final coating bonding agent even in service in an environment of a high load and a high temperature, and is well-suited for manufacturing a support for run-flat tire which is used in an environment of a high load and a high temperature.

[Run-Flat Tire Support]

Figure 3:
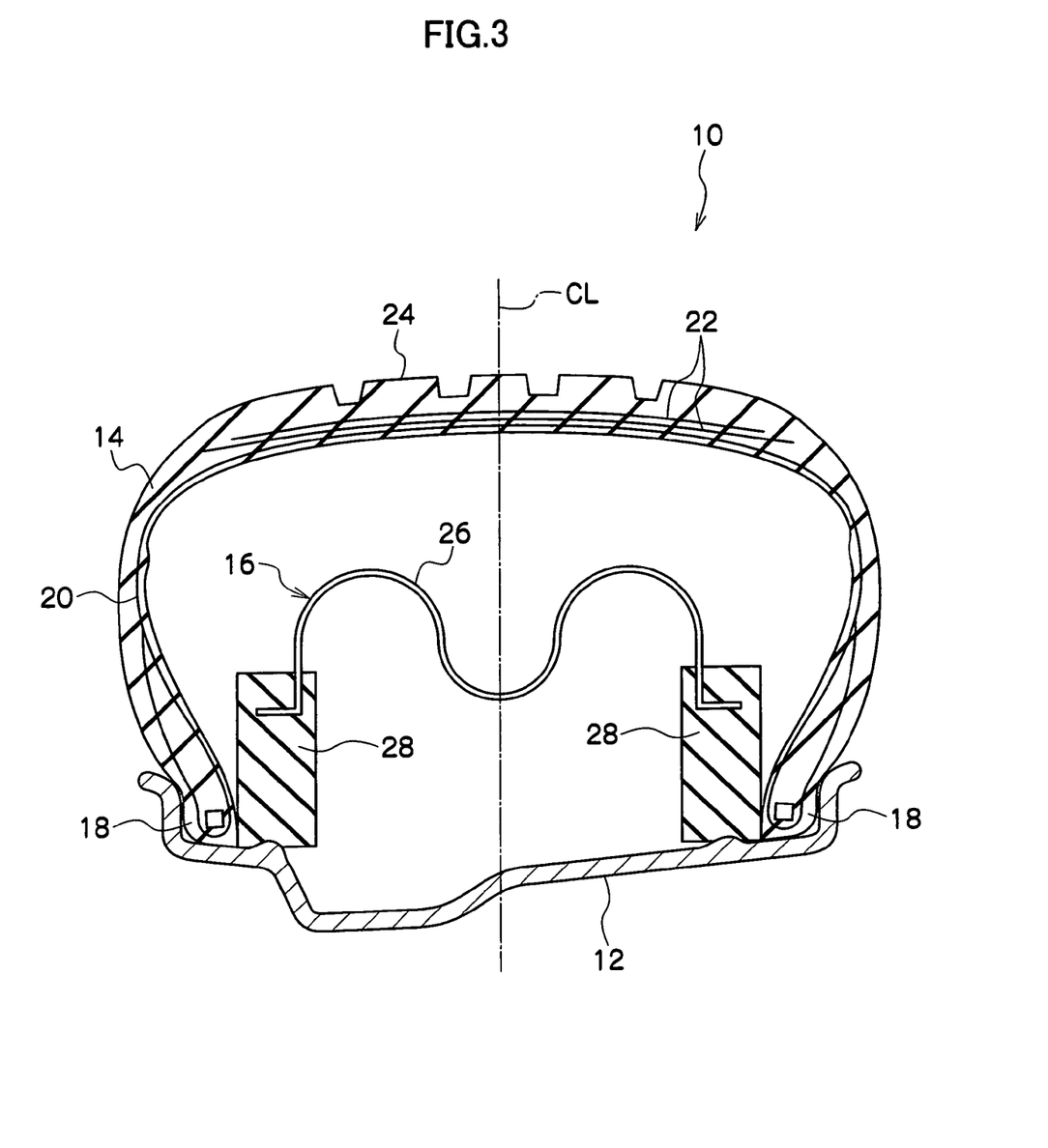
FIG. 3 is a sectional view of the pneumatic run-flat tire loaded on a rim.

The support manufactured by the first and second manufacturing methods of the present invention is applicable to various pneumatic run-flat tires. FIG. 3 shows an example of pneumatic run-flat tire to which the support is applied.

The (pneumatic) run-flat tire 10 refers to a pneumatic run-flat tire with which a pneumatic tire 14 and a support 16 are assembled to a rim 12 as shown in FIG. 3. The rim 12 is a standard rim which matches the size of the pneumatic tire 14.

As shown in FIG. 3, the pneumatic tire 14 comprises a pair of bead parts 18; a carcass 20 in the shape of a toroid that extends, striding over both bead parts 18; a plurality of (two in the present embodiment) belt layers 22 located in the crown part of the carcass 20; and a tread part 24 which is formed on the top of the belt layer 22.

The support 16 which is disposed in the inside of the pneumatic tire 14 is a member which is formed in the shape of a ring having a sectional geometry as shown in FIG. 3, comprising a supporting part 26, and a leg part 28 is vulcanization-formed at both ends of the supporting part 26.

The pneumatic run-flat tire as described above is manufactured by disposing the support 16 which has been manufactured in the manner as described above in the inside of the pneumatic tire 14, and assembling the leg parts 28 for the support 16 to the rim 12 together with the pneumatic tire 14.

Herein, the standard rim refers to the rim as defined in the JATMA YEAR BOOK 2002 edition (by The Japan Automobile Tire Manufacturers Association), and the standard load refers to a load corresponding to the maximum load-carrying capacity when the specification for single wheel as given in the JATMA YEAR BOOK 2002 edition (by The Japan Automobile Tire Manufacturers Association) is applied.

In any countries other than Japan, the load refers to the maximum load (maximum load-carrying capacity) for the single wheel with an applicable size as given in the following standard; the internal pressure refers to the pneumatic pressure corresponding to the maximum load (maximum load-carrying capacity) for the single wheel as given in the following standard; and the rim refers to the standard rim (or "Approved Rim" or "Recommended Rim") with an applicable size as given in the following standard.

The specifications for any particular tire are determined on the industrial standard which is effective in the area where the tire is produced or used. For example, in USA, "The Tire and Rim Association Inc. Year Book" is applied to the tire product, and in Europe, "Standards Manual of the European Tire and Rim Technical Organization" is applied.

With the pneumatic run-flat tire as described above, if the internal pressure for the pneumatic tire 14 is lowered, the rear surface of the tread part 24 of the pneumatic tire 14 is supported by the convex part of the support 16 (the portion of the support 16 that juts out toward the radial direction outside on the drawing), which allows the vehicle to run as it is.

In addition, the aforementioned run-flat tire support may be adapted to be of the following aspects, provided that the supporting part and the leg part are jointed to each other by applying the aforementioned first or second manufacturing method of the present invention.

(First Support)

A first support of the present invention has a supporting part and a leg part, and is of annular structure which is capable of supporting the load at the time of run-flat running, a part or all of the surface of the supporting part being formed, being covered with a coating layer. And, the coating layer is any one of a resin layer containing a resin, a coating film layer made up of a coating material containing a resin, a vulcanization bonding agent layer containing a rubber ingredient, and a rubber composition layer containing a diene-base rubber as the principal ingredient.

Corrosion (rust) occurs when moisture, oxygen (an oxidizing agent), and a metal exist, which causes a local cell action. Then, it becomes necessary that, by means of the coating layer, any one of the above-mentioned substances be prevented from being contacted with the supporting part. Depending upon the material of this coating layer, there is a difference in isolation effect (moisture permeability, oxygen permeability, and oxidized substance permeability), thus the level of rust prevention varies. Then, as the coating layer, a layer as described in the present specification is provided.

As the resin layer containing a resin, phenolic resin, alkyd resin, epoxy resin, and the like, may be used.

As the coating film layer made up of a coating material containing a resin, a composition containing a coating material, such as a rust preventive coating material, or the like, in addition to the above-mentioned resin, and the like, may be used.

As the vulcanization bonding agent layer containing a rubber ingredient, a layer made up of a vulcanization bonding agent layer containing natural rubber, isoprene rubber, polybutadiene rubber, polystyrene- butadiene rubber, or the like, may be used.

The rubber composition layer containing a diene-base rubber as the principal ingredient is not particularly limited, provided that the principal ingredient is a diene-base rubber, however, a layer containing natural rubber, isoprene rubber, polybutadiene rubber, polystyrene-butadiene rubber, or the like, may be used.

From the viewpoint of corrosion resistance, each of the above-mentioned layers is preferably approx. 1 to 5 mm in thickness, and is more preferably approx. 2 to 4 mm.

Figure 4:
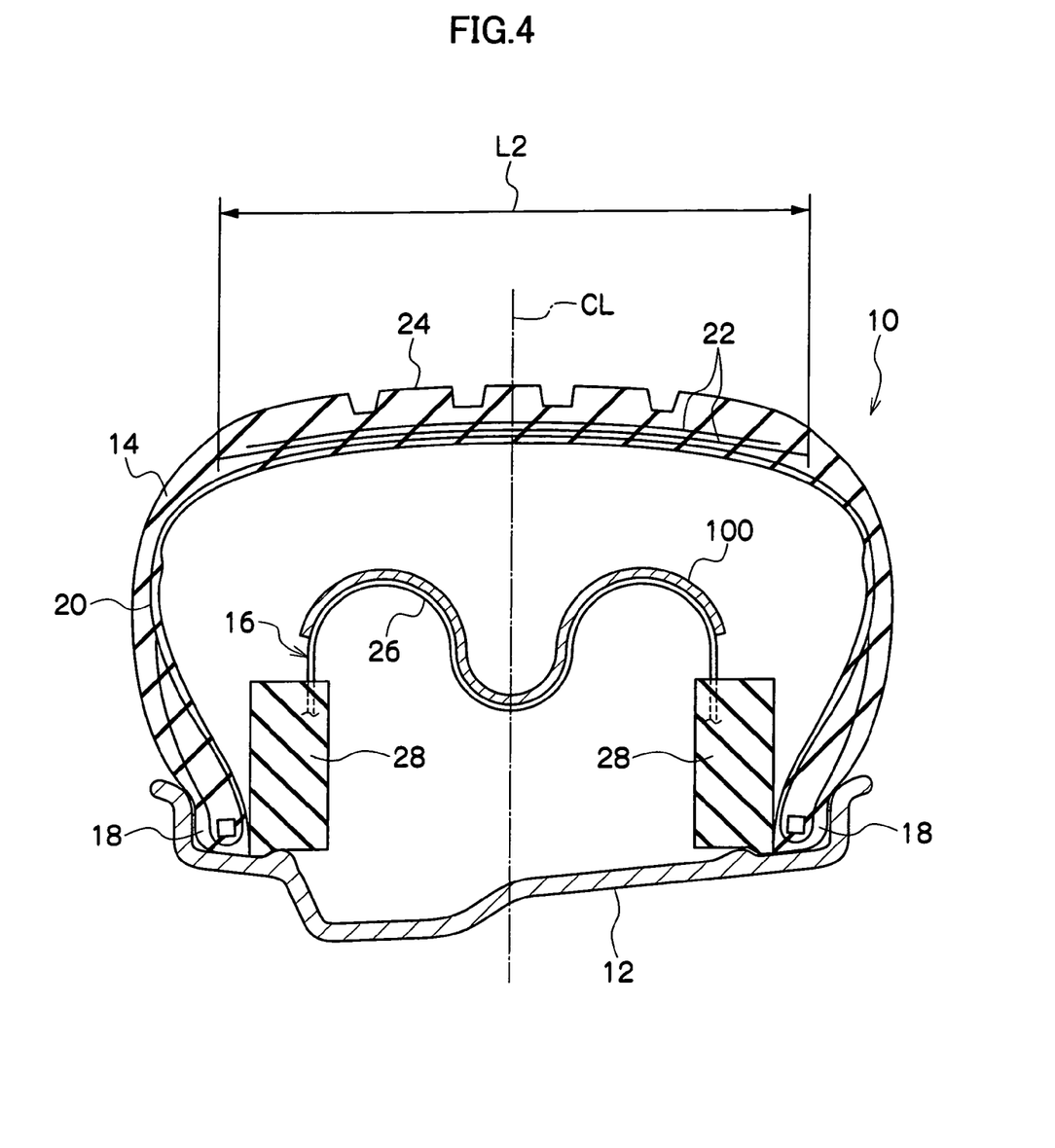
FIG. 4 is a sectional view of the pneumatic run-flat tire loaded on a rim.
Figure 5:
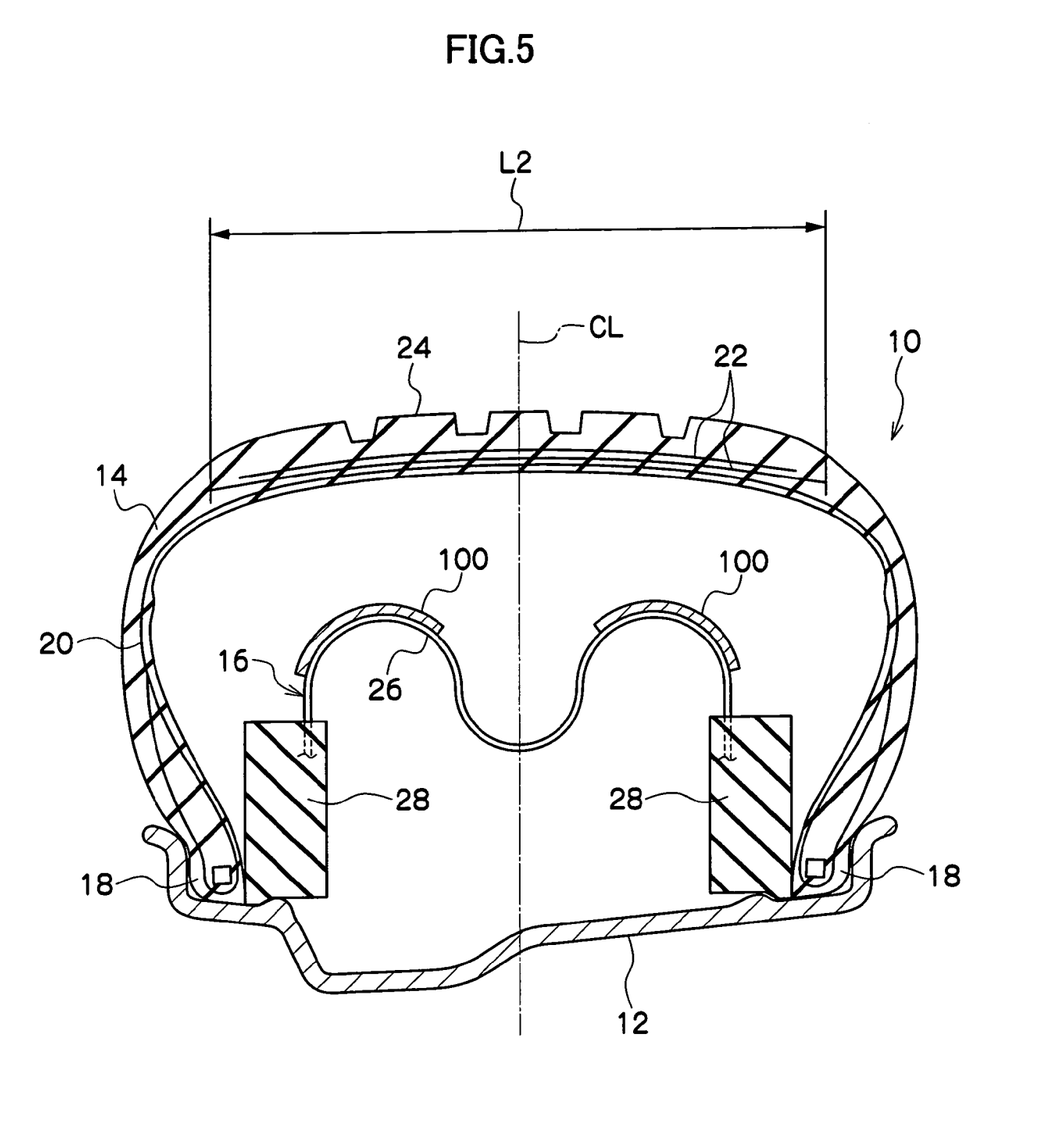
FIG. 5 is a sectional view of the pneumatic run-flat tire loaded on a rim.

As shown in FIG. 4, the coating layer 100 may be provided over the entire supporting part surface on the tread part rear surface side, and as shown in FIG. 5, the coating layer 100 may be selectively provided in the region (the convex part) which is in contact with the tread part rear surface at the time of run-flat running.

In at least the region of the supporting part where a coating layer is formed, it is preferable that the chemical conversion treatment by an inorganic salt-base chemical conversion treatment agent be previously provided. The chemical conversion coating (inorganic salt) has an insulation effect, increasing the effect of the coating. In other words, it provides an effect of rendering the local cell action difficult to be caused. The chemical conversion treatment may use the aforementioned chemical conversion agent, for example, however, among others, zinc phosphate-base is preferable. In addition, the rust prevention treatment may use a rust preventive coating material composition containing a coating material and a pigment in the synthetic resin. At this time, as the synthetic resin, phenol, alkyd, epoxy, an isocyanate-containing compound, and other various substances may be used.

(Second Support)

A second support of the present invention has a supporting part and a leg part, and is an annular run-flat tire support which is capable of supporting the load at the time of run-flat running, the supporting part being made up of a 780 N-class High-Tension steel.

In addition, it is preferable that the supporting part have one or more convex parts jutting out toward the outside in the radial direction section, and one or more concave parts jut out toward the inside.

Figure 6:
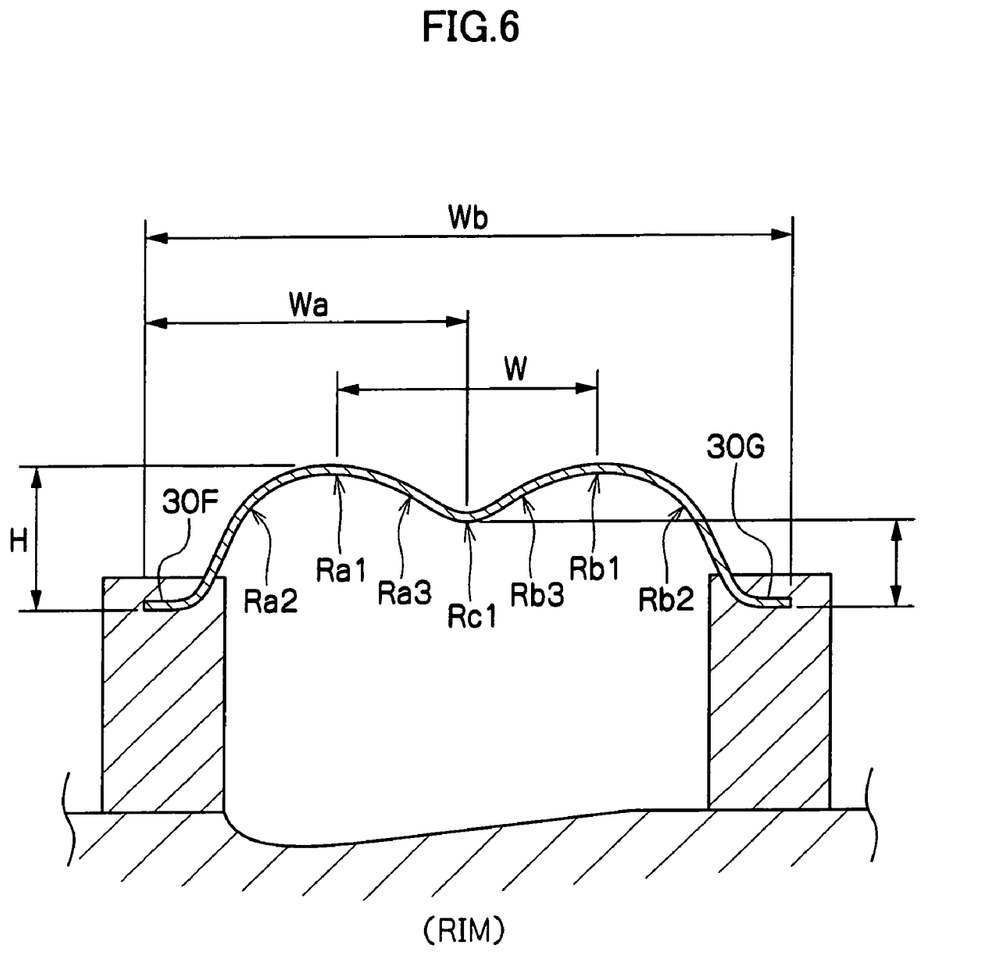
FIG. 6 is a partial sectional view for explanation of the geometry of the support.

In addition, as shown in FIG. 6, at least one said convex part is composed of a plurality of circular arcs which are different in radius of curvature, and among these circular arcs, the radius of curvature of the circular arc including the vertex of said convex part (Ra1 and Rb1 in FIG. 6) is the largest.

And, it is preferable that the spacing (W) between one convex part and the other convex part which is the closest to that convex part; the height (H) of the one convex part; the number (N) of one or more convex parts; and the radius of curvature (R) of the circular arc including the vertex of said convex part meet the relationship of the following expression (1).

$$R(\text{mm}) \geq 12 W/HN \qquad \text{Expression (1)}$$

The convex part of the supporting part is composed of a plurality of circular arcs which are different in radius of curvature, and among these circular arcs, the radius of curvature of the circular arc including the vertex of the convex part is the largest, thus in the emergency running in the state in which the internal pressure has been lowered, the contact area between the tread internal surface and the support is larger than that when the convex curved line part is composed of circular arcs having a single radius of curvature.

Therefore, the possible load imposed on the tread internal surface in the emergency running in the state in which the internal pressure has been lowered is reduced, which suppresses the possible damage to the tread. Herein, "the vertex of the convex part" refers to the place where the height H of the supporting part from the flange part 30F, 30G is the greatest as shown in FIG. 6. "The spacing (W) between one convex part and the other convex part which is the closest to that convex part" refers to the distance between the vertexes (Ra1) and (Rb1) of the respective convex parts as shown in FIG. 6.

In order to cause the above-mentioned functions to be effectively exerted, it is preferable to meet the preferences as given in the following paragraphs (1) to (6):

(1) The absolute value of the radius of curvature of the circular arc including the vertex of the convex part is preferably approx. 25 mm or over.

(2) The width of the circular arc portion including the vertex is preferably approx. 80% or so of the convex part width (Wa). Herein, "the convex part width" refers to the distance between the deepest place (Rc1) of the concave part and the end part of the flange part 30F as shown in FIG. 6.

(3) The width of the circular arc portion including the vertex is preferably approx. 40% or so of the width (Wb) of the supporting part. Herein, "the width of the supporting part" refers to the distance between the end part of the flange part 30F and the end part of the flange part 30G as shown in FIG. 6.

(4) The supporting part is preferably approx. 1 to 2 mm in thickness. In addition, the tensile strength is preferably assured with a high tensile strength steel plate of approx. 80 kg/mm². If the tensile strength can be assured, aluminum alloy, FRP, or the like, may be used.

(6) The supporting part of the support is preferably in the shape of a closed annulus. It may be provided with a slit as given in Japanese Patent Laid-Open Publication (JP-A) No. 2003-48410.

(7) The leg part is preferably made up of a rubber-elastic material. The multilayer structure as given in U.S. Pat. No. 64,639,474 B1 may be applied.

(8) The sectional geometry of the supporting part is preferably composed of two convex parts and a single concave part located therebetween. A configuration having three or more convex parts as "convex part+concave part+convex part+concave part+convex part" may be used. Preferably, the number of convex parts is 2 to 4.

(9) Specifically, it is preferable that the support is used with a run-flat tire of 225/60R17 tire size and an application rim of 7JJ×17, and preferably the support has a total width of 150 mm, and a radial direction height of 60 mm.

(10) The sectional geometry of the supporting part is preferably symmetric about the equatorial plane. It may be asymmetric in consideration of the camber, and the like, at the time of loading on the vehicle.

Also for the aforementioned first support of the present invention, at least the supporting part is preferably made up of a 780 N-class High-Tension steel.

Conventionally, as the material for the supporting part, a steel material having a low strength (380 N or under) has been used, and by drawing-forming it, the supporting part has been obtained. Because the above-mentioned steel material is low in strength, the thickness has been increased in order to support the load at the time of running on flat, thus the weight of the supporting part has been large.

If, to solve this difficulty, the strength of the steel plate is increased (to 780 N or higher), the formability is extremely decreased, resulting in impossibility of forming to the shape of a metal shell, and drawing may often cause cracking. Then, as a result of examination of the possible causes for the above-mentioned problem, the following three solutions have been obtained for the first and second supports.

(1) Because the elongation of the material is low, cracking is caused at the time of drawing. In order to increase the elongation, the amount of carbon in the steel material is reduced for improvement.

(2) The welded part of the material is hardened, resulting in development of a discontinuous point, which causes cracking in the welded part and the area in the vicinity thereof at the time of drawing. This problem can be eliminated by reducing the carbon equivalent weight.

(3) Impurities (a manganese-base oxide, and the like) contained in the material may act as an initiation point from which cracking is caused in drawing. Therefore, by reducing the amounts of the impurities, the formability can be improved.

Examples of method for drawing as mentioned in (1) include manual spinning, spinning, roll forming, hydroforming, and the like, however, with any method, a formed item in the shape of a support ring cannot be obtained without the elongation percentage in the main direction of the material exceeding 10%. When the elongation percentage in the main direction exceeds 10% as this, it is preferable that the elongation for the material be 20% or higher, and more preferably it is 22% or higher. If the elongation for the material is under 20%, the material will crack in working. Therefore, in order to avoid this, the amount of carbon is preferably approx. $15 \times 10^{-2}\%$ or below, and is more preferably approx. $10 \times 10^{-2}\%$ or below. If the amount of carbon exceeds approx. $15 \times 10^{-2}\%$, the elongation may not be able to be 20% or higher.

In order to assure the strength of the material even if the carbon equivalent weight is lowered as mentioned in (2), Si, Mn, P, S, and the like, are compounded as ingredients other than carbon. For Si and Mn among these, the carbon equivalent weight is assumed as follows:

$$Ceq\ (carbon\ equivalent\ weight) = C + Si/24 + Mn/6$$

In the expression of the above-mentioned carbon equivalent weight, C, Si, and Mn denote the content (% by mass) of carbon, silicon, and manganese, respectively.

This carbon equivalent weight is preferably approx. 0.6 or under, and is more preferably approx. 0.55 or under. If the value thereof exceeds 0.6, the hardness of the welded part exceeds 400 in HV value, resulting in development of a discontinuous point, with the elongation being extremely lowered, which may cause fracture at the time of drawing.

(3) An Mn oxide can be an inclusion in the steel material, and this substance acts as an initiation point from which the material is fractured in forming. The amount of this inclusion is defined as the parameter called the cleanliness in JIS G0555 "Microscopic testing method for the non-metallic inclusions in steel". This cleanliness is preferably approx. 0.05 or under, and is more preferably approx. 0.02 or under. If the value of approx. 0.05 is exceeded, the inclusion may act as the initiation point from which the material is fractured in forming.

By using the following EXAMPLEs, the present invention will be specifically described, however, the present invention is not limited to these EXAMPLEs.

EXAMPLE 1

By the roll forming method, the supporting part of a support was formed from a flat plate (a high tensile strength steel plate with a thickness of 1.6 mm) so as to provide a geometry as shown in FIG. 1 and FIG. 2.

The region in which the leg part including the flange part is to be formed and the supporting part were subjected to a chemical conversion treatment (surface treatment) using zinc phosphate as the chemical conversion agent. The coating film thickness was 4 μm.

Thereafter, the supporting part, excluding the portion where the leg part is to be formed, was coated with an acrylic resin coating material to provide a rust prevention coating treatment for formation of a coating film having a thickness of 50 μm. The bonding agent was applied to the portion where the leg part is to be formed, and vulcanization bonding was provided to manufacture a support to the end part of which the leg part was bonded.

EXAMPLE 2

A support was manufactured in the same manner as that in EXAMPLE 1, except that, instead of the high tensile strength steel plate, an SUS 304L flat plate (with a thickness of 2.0 mm) was used, and instead of the acrylic resin coating material, a polyester resin coating material was used to provide a rust prevention coating treatment (the coating film thickness was 50 μm).

EXAMPLE 3

A support was manufactured in the same manner as that in EXAMPLE 1, except that the portion where the chemical conversion treatment was provided was subjected to a surface treatment which applies chromic acid chromate (to a thickness of 4 μm).

EXAMPLE 4

A support was manufactured in the same manner as that in EXAMPLE 1, except that the rust prevention treatment was not provided.

COMPARISON EXAMPLE 1

A support was manufactured in the same manner as that in EXAMPLE 1, except that the chemical conversion treatment and the rust prevention treatment were not provided.

COMPARISON EXAMPLE 2

A support was manufactured in the same manner as that in EXAMPLE 1, except that, instead of the high tensile strength steel plate, an SUS 304L flat plate (with a thickness of 2.0 mm) was used, and the chemical conversion treatment and the rust prevention treatment were not provided.

To the supports manufactured in EXAMPLEs 1 to 4 and COMPARISON EXAMPLEs 1 to 2, salt water was sprayed to carry out a salt spray test for evaluation of the time in which the supporting part was peeled off from the leg part and the time in which the supporting part, where the leg part was not bonded, was rusted. The results are as given in Table 1 below. For the salt spray test, a sodium chloride solution (5% by mass) at 35° C. was used.

The run-flat tires manufactured were actually subjected to run-flat running (200 km), and the supports after the running were observed to find that, especially with the supports manufactured in EXAMPLEs 1 to 3, the supporting part was free from rust, and the like, presenting no problem on appearance. In addition, with the supports manufactured in EXAMPLEs 1 to 4, the adhesion between the supporting part and the leg part was good.

EXAMPLES 5 TO 12 AND COMPARISON EXAMPLES 4 AND 5

A bonding agent was applied to the bonding region of the radial-direction inside end part of said supporting part that is provided for bonding to said leg part, and said leg part in the unvulcanized state was subjected to a vulcanization bonding treatment through the bonding agent, whereby the leg part was bonded to said bonding region (the bonding step). The bonding agent application treatment was performed by sequentially applying a prime coating bonding agent and a final coating bonding agent to the above-mentioned bonding region. The prime coating bonding agent and the final coating bonding agent are as given in Table 2 below. In addition, in EXAMPLEs 5 to 8 and COMPARISON EXAMPLE 5, a chemical conversion treatment was provided using a zinc phosphate-base chemical conversion agent before the bonding step.

A pneumatic tire which has the same configuration as that of the aforementioned pneumatic run-flat tire (see FIG. 3) and into which the support that was manufactured in each of

TABLE 1

| | Support material | Chemical conversion treatment given or not given | Rust prevention treatment given or not given | Salt spray test | |
|---|---|---|---|---|---|
| | | | | Peeling time (h) | Rusting time (h) |
| EXAMPLE 1 | High tensile strength steel plate | given | given | 1000 or over | 1000 or over |
| EXAMPLE 2 | SUS 304L | given | given | 1000 or over | 1000 or over |
| EXAMPLE 3 | High tensile strength steel plate | given | given | 1000 or over | 1000 or over |
| EXAMPLE 4 | High tensile strength steel plate | given | not given | 1000 or over | 50 |
| COMPARISON EXAMPLE 1 | High tensile strength steel plate | not given | not given | 240 | 1 |
| COMPARISON EXAMPLE 2 | SUS 304L | not given | not given | 240 | 1000 or over |

As can be seen from Table 1, by providing the surface treatment including the chemical conversion treatment, the supports with which the adhesion to the leg part is high and which will not be corroded for many hours, compared to the COMPARISON EXAMPLEs could have been manufactured.

A pneumatic tire which has the same configuration as that of the aforementioned pneumatic run-flat tire (see FIG. 3) and into which the support that was manufactured in EXAMPLE 1 to 4 was inserted into a pneumatic tire of 205/50R16 size was assembled to a standard rim (6J) corresponding to the above-mentioned tire size for manufacturing a run-flat tire.

EXAMPLEs 1 to 4 was inserted into a pneumatic tire of 205/50R16 size was assembled to a standard rim (6J) corresponding to the above-mentioned tire size for manufacturing a run-flat tire. With the oxygen internal pressure being set at 230 kPa, the run-flat tire was left for two weeks at 70° C. in a thermostatic chamber. The run-flat test was conducted by loading the respective test tires on the rear right wheel of an FR car; removing the air valve core to make the tire internal pressure the same as the atmospheric pressure; and measuring the running distance before occurrence of a trouble, the result being expressed by index. In Table 2, the greater the numerical value given, the better the tire durability is.

TABLE 2

|  | Chemical conversion agent | Prime coating bonding agent | Final coating bonding agent | Maleimide derivative | Actual vehicle durability (index) |
|---|---|---|---|---|---|
| EXAMPLE 5 | Zinc phosphate-base | Metalock PH56 (with no chlorine) | Sixon 536EF | containing | 1400 |
| EXAMPLE 6 | Zinc phosphate-base | P6EF (with small amount of chlorine) | Sixon 536EF | containing | 1300 |
| EXAMPLE 7 | Zinc phosphate-base | Metalock PH56 (with no chlorine) | Chemlock 254 | containing | 1200 |
| EXAMPLE 8 | Zinc phosphate-base | Chemlock 205 (chlorine-containing) | Sixon 536EF | containing | 900 |
| EXAMPLE 9 | Blasting treatment | Metalock PH56 (with no chlorine) | Sixon 536EF | containing | 1100 |
| EXAMPLE 10 | Blasting treatment | P6EF (with small amount of chlorine) | Sixon 536EF | containing | 1050 |
| EXAMPLE 11 | Blasting treatment | Chemlock 205 (chlorine-containing) | Sixon 536EF | containing | 800 |
| EXAMPLE 12 | Blasting treatment | Chemlock 205 (chlorine-containing) | Chemlock 254 | containing | 600 |
| COMPARISON EXAMPLE 4 | Blasting treatment | Chemlock 205 (chlorine-containing) | Chemlock 220 | not given | 100 |
| COMPARISON EXAMPLE 5 | Zinc phosphate-base | Chemlock 205 (chlorine-containing) | Chemlock 220 | not given | 150 |

From Table 2, it has been verified that, with the supports manufactured in EXAMPLEs 5 to 12, the adhesion between the supporting part and the leg part was good.

EXAMPLE 13

In the same manner as in EXAMPLE 1, the supporting part and the leg part were bonded to each other. The leg part was provided in the same manner as in EXAMPLE 1 for manufacturing the support, except that the surface layer of the support was made as given in Table 3 below. To the surface on the tread part rear side of the supporting part, Chemlock 254 (the final coating bonding agent) was applied to form a coating layer (30 μm).

EXAMPLES 14 TO 24 and REFERENCE EXAMPLEs 1 AND 2

The supports were manufactured in the same manner as in EXAMPLE 13, except that the coating layer was made as in Table 3 below.

TABLE 3

|  | Coating layer |
|---|---|
| EXAMPLE 13 | Chemlock 254 (final coating bonding agent) |
| EXAMPLE 14 | Chemlock 205 (prime coating bonding agent) |
| EXAMPLE 15 | Chemlock 205 + Chemlock 254 |
| EXAMPLE 16 | Chemical conversion coating + Chemlock 254 |
| EXAMPLE 17 | Chemical conversion coating + Chemlock 205 |
| EXAMPLE 18 | Chemical conversion coating + Chemlock 205 + Chemlock 254 |
| EXAMPLE 19 | Coating material A |
| EXAMPLE 20 | Chemical conversion coating + coating material A |
| EXAMPLE 21 | Coating material B |
| EXAMPLE 22 | Chemical conversion coating + coating material B |
| EXAMPLE 23 | Rubber |
| EXAMPLE 24 | Chemical conversion coating + rubber |

TABLE 3-continued

|  | Coating layer |
|---|---|
| REFERENCE EXAMPLE 1 | not given |
| REFERENCE EXAMPLE 2 | Chemical conversion coating |

Notes:
Coating material A: Phenolic resin-base-containing coating material
Coating material B: Epoxy resin-containing coating material
Chemical conversion coating: Zinc phosphate-base coating The supports manufactured in EXAMPLEs 13 to 24 and REFERENCE EXAMPLEs 1 and 2 were subjected to the SST durability evaluation (the evaluation by the salt spray test (SST) in conformity with JIS Z2371 "Methods of salt spray testing")). Specifically, in conformity with JIS Z2371, the salt spray test was conducted for 480 hr, and the following criteria were used for evaluation. The results are as given in Table 4 below.

Here are the evaluation criteria.

A: It has no rusting and coating film peeling defects, and is extremely excellent from the viewpoint of practical use.
B: It has a slight rusting or coating film peeling defect, but can be said to be excellent from the viewpoint of practical use.
C: It has a bit of rusting or coating film peeling defect, but there is no problem from the viewpoint of practical use.
D: It has rather a lot of rusting or coating film peeling defect.

In addition, the actual vehicle run-flat durability was evaluated by conducting a promoted degradation test, i.e., by assembling the tire to the rim together with the support at a normal pressure; then, filling the tire inside with oxygen at an internal pressure of 230 kPa; and leaving it for two weeks at 70° C. in a thermostatic chamber. The run-flat test was conducted by loading the respective test tires on the rear right wheel of an FR car; removing the air valve core to make the tire internal pressure the same as the atmospheric pressure; and measuring the running distance before occurrence of a trouble, the result being expressed by index.

TABLE 4

|  | SST durability | Actual vehicle durability |
|---|---|---|
| EXAMPLE 13 | B |  |
| EXAMPLE 14 | B |  |
| EXAMPLE 15 | B | 313 |
| EXAMPLE 16 | B |  |
| EXAMPLE 17 | B |  |
| EXAMPLE 18 | B | 384 |
| EXAMPLE 19 | B |  |
| EXAMPLE 20 | A |  |
| EXAMPLE 21 | A |  |
| EXAMPLE 22 | A | 700 or higher* |
| EXAMPLE 23 | C | 123 |
| EXAMPLE 24 | C | 156 |
| REFERENCE EXAMPLE 1 | D | 100 |
| REFERENCE EXAMPLE 2 | D | 111 |

*No failure was caused, thus the test was left off.

From Table 4, it has been verified that any of the supports in EXAMPLEs 13 to 24 was excellent in durability.

EXAMPLE 25 AND REFERENCE EXAMPLE 3

The supports were manufactured in the same manner as in EXAMPLE 1, except that the geometry of the support (for the supporting part, a 780 N-class High-Tension steel was used) was adapted to be as shown in FIG. 6, and Ra1 to Ra3, Rb1 to Rb3, and Rc1 in FIG. 6 were set as given in Table 5 below.

In addition, the test conditions for RF durability were as follows, i.e., a test tire in which said support was incorporated was loaded on a 2500-cc rear-wheel-driven passenger car; the air pressure in the tire for the rear right wheel was set at 0 kPa; the air pressure in the tire in the other three places was set at 210 kPa; and the car was run at 90 km/h until it went wrong. The results were expressed by index, assuming the result for REFERENCE EXAMPLE 3 is 100. In Table 5, the greater the numerical value given, the better the tire durability is.

TABLE 5

|  | EXAMPLE 25 | REFERENCE EXAMPLE 3 |
|---|---|---|
| Ra1 (=Rb1) | 29 mm | 23 mm |
| Ra2 (=Rb2) | 13 mm | — |
| Ra3 (=Rb3) | 13 mm | — |
| RC1 | 19 mm | 19 mm |
| Axial direction width for Ra1 part (and Rb1 part) | 25 mm | 36 mm |
| Axial direction width for Ra2 part (and Rb2 part) | 6 mm | — |
| Axial direction width for Ra3 part (and Rb3 part) | 5 mm | — |
| Axial direction width for Ra1 part | 12 mm | 12 mm |
| RF durability | 140 | 100 |

From Table 5, it has been verified that the support in EXAMPLE 25 was bettered in durability.

EXAMPLE 26 AND REFERENCE EXAMPLES 4 to 6

The supports were manufactured in the same manner as in EXAMPLE 25, except that the material and the characteristics of the supporting part were made as shown in Table 6 below. The term "inclusion" in Table 6 refers to manganese oxide.

TABLE 6

|  | EXAMPLE 26 | REFERENCE EXAMPLE 4 | REFERENCE EXAMPLE 5 | REFERENCE EXAMPLE 6 |
|---|---|---|---|---|
| Amount of carbon ($\times 10^{-2}$% by mass) | 8.0 | 14.1 | 8.0 | 8.4 |
| Elongation (%) | 23 | 20 | 23 | 22 |
| Carbon equivalent weight (%) | 0.503 | 0.606 | 0.428 | 0.416 |
| Inclusion (% by mass) | 0.007 | 0.01 | 0.007 | 0.031 |

The supporting part of the support in EXAMPLE 26 could be formed without any fracture being caused on the way, while that in REFERENCE EXAMPLEs 4 to 6 could not be formed, because the welded part, and the like, were fractured.

INDUSTRIAL APPLICABILITY

According to the present invention, the supporting part and the leg part of the run-flat tire support have a high bondability, thus the run-flat tire support can be utilized in a run-flat tire which is excellent in durability, and as the manufacturing method therefor.

| Explanation of signs | |
|---|---|
| 10 | Pneumatic run-flat tire |
| 12 | Rim |
| 14 | Pneumatic tire |
| 16 | Support |
| 24 | Tread part |
| 26 | Supporting part |
| 28 | Leg part |

What is claimed is:

1. A manufacturing method for annular run-flat tire support which has a supporting part and a leg part, which, at the time of run-flat running, is capable of carrying load, comprising:
   supplying the supporting part and the leg part, wherein at least the supporting part has been subjected to chemical conversion treatment by a zinc phosphate-base treatment agent; and
   applying a bonding agent to the bonding region of the radial-direction inside end part of the supporting part that is provided for bonding to the leg part, and subjecting the leg part in the unvulcanized state to a vulcanization bonding treatment through the bonding agent, whereby the leg part is bonded to the bonding region,
   wherein the application of the bonding agent at the bonding is a treatment in which a prime coating bonding agent is applied to the bonding region, and then a final coating bonding agent is applied,
   and wherein the final coating bonding agent is a bonding agent containing a maleimide derivative.

2. The manufacturing method for run-flat tire support of claim 1, wherein a coating film thickness for the final coating bonding agent is 2 µm or over.

3. The manufacturing method for run-flat tire support of claim 1, further comprising, subjecting the supporting part to a chemical conversion treatment with a zinc phosphate-base treatment agent prior to the bonding.

4. The manufacturing method for run-flat tire support of claim 1, wherein the prime coating bonding agent is a bonding agent containing no halogen.

5. An annular run-flat tire support which has a supporting part and a leg part, which, at the time of run-flat running, is capable of carrying load, and which is manufactured by a method comprising:
   supplying the supporting part and said leg part, wherein at least the supporting part has been subjected to chemical conversion treatment by a zinc phosphate-base treatment agent; and
   applying a bonding agent to the bonding region of the radial-direction inside end part of the supporting part that is provided for bonding to the leg part, and subjecting the leg part in the unvulcanized state to a vulcanization bonding treatment through the bonding agent, whereby the leg part is bonded to said bonding region,
   wherein the application of the bonding agent at the bonding step is a treatment in which a prime coating bonding agent is applied to the bonding region, and then a final coating bonding agent is applied,
   and wherein the final coating bonding agent is a bonding agent containing a maleimide derivative.

* * * * *